No. 707,114. Patented Aug. 19, 1902.
D. JACKSON.
POTATO PLOW.
(Application filed Apr. 1, 1902.)
(No Model.) 2 Sheets—Sheet 1.
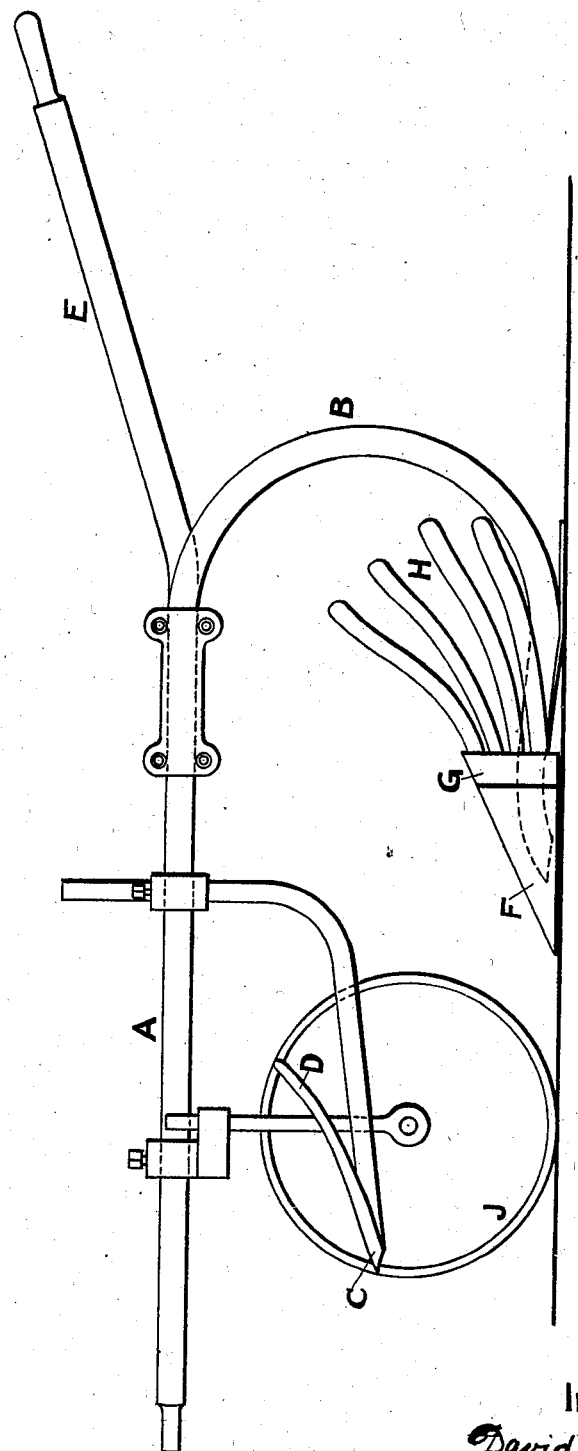
WITNESSES
Allan Bennett.
Harry Davies.
INVENTOR
David Jackson
per John R. Walsh
Attorney.

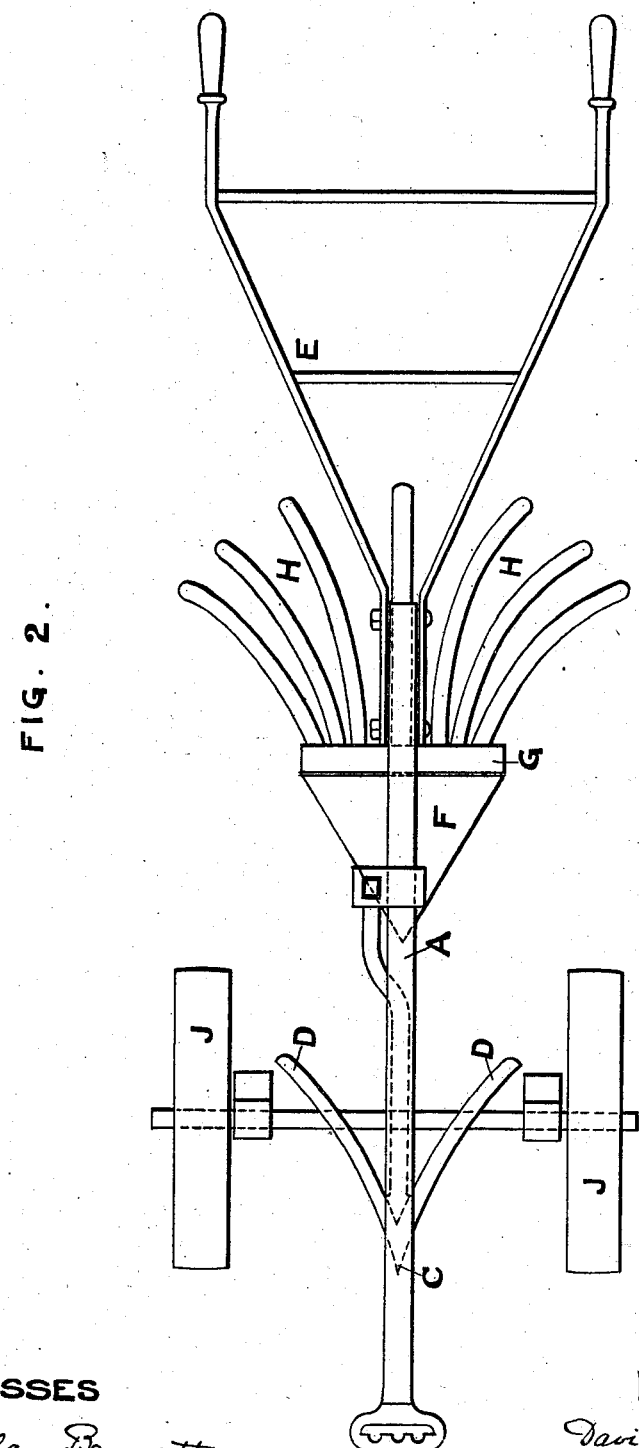

UNITED STATES PATENT OFFICE.

DAVID JACKSON, OF TICKHILL, ENGLAND.

POTATO-PLOW.

SPECIFICATION forming part of Letters Patent No. 707,114, dated August 19, 1902.

Application filed April 1, 1902. Serial No. 100,945. (No model.)

*To all whom it may concern:*

Be it known that I, DAVID JACKSON, a subject of the King of Great Britain and Ireland, residing at Tickhill, near Rotherham, in the county of York, England, have invented new and useful Improvements in Potato-Plows, of which the following is a specification.

The object of my invention is to construct potato-plows so as to prevent the tops of the potatoes and weeds from collecting thereon and choking the same.

My invention is illustrated in the accompanying drawings, in which—

Figure 1 is a side elevation of my improved potato-plow. Fig. 2 is a plan view of Fig. 1.

I employ a metal beam A, preferably bow-shaped at B and having at its top front end a share or divider C, with extended arms D. The opposite end of the top of the bow is attached to the ordinary stilts E. At the front and lower end of the bow is bolted or otherwise secured the share F, provided with a fork or grate G, with its extended prongs or fingers H for throwing the potatoes on each side out of the way of the machine. Pulleys are provided at J for carrying the apparatus. The divider C and the share F are adjustable as to their positions.

The action is as follows: As the plow engages each row the divider in front divides the potato-tops and weeds and throws them on each side, so that they are clear of and cannot choke or obstruct the fork or bow. The said divider C may be applied to other constructions of potato-plow; but I prefer it as applied to the said form of bow-beam.

What I claim as my invention, and desire to secure by Letters Patent, is—

The combination, with a plow-beam, and wheels supporting the front part thereof; of a divider having its point arranged centrally under the plow-beam between the said wheels and having two upwardly and rearwardly inclined arms which project in opposite directions, a share secured to the lower and rear part of the plow-beam, and spreading prongs projecting rearwardly from the said share, substantially as set forth.

In testimony whereof I have signed my name to this specification in the presence of two subscribing witnesses.

DAVID JACKSON.

Witnesses:
R. OLIVER JONES,
JOHN E. WALSH.